US006421490B1

(12) United States Patent
Liu

(10) Patent No.: US 6,421,490 B1
(45) Date of Patent: *Jul. 16, 2002

(54) LOW SLOPE DISPERSION MANAGED WAVEGUIDE

(75) Inventor: Yanming Liu, Horseheads, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,509

(22) Filed: Jan. 28, 1999

Related U.S. Application Data

(60) Provisional application No. 60/075,754, filed on Feb. 23, 1998, and provisional application No. 60/088,023, filed on Jun. 4, 1998.

(51) Int. Cl.[7] .................................. G02B 6/02
(52) U.S. Cl. ....................................... 385/127
(58) Field of Search .................................. 385/123–128

(56) References Cited

U.S. PATENT DOCUMENTS

| 5,361,319 A | | 11/1994 | Antos et al. ................ 385/123 |
| 5,555,340 A | * | 9/1996 | Onishi et al. ................ 385/127 |
| 5,568,583 A | * | 10/1996 | Akasaka et al. .............. 385/123 |
| 5,611,016 A | | 3/1997 | Fangmann et al. |
| 5,673,354 A | | 9/1997 | Akasaka et al. .............. 385/127 |
| 5,719,696 A | | 2/1998 | Chraplyvy et al. |
| 5,721,800 A | | 2/1998 | Kato et al. ................... 385/127 |
| 5,778,128 A | | 7/1998 | Wildeman ................... 385/123 |
| 5,781,684 A | | 7/1998 | Liu ............................. 385/124 |
| 5,802,236 A | * | 9/1998 | DiGiovanni et al. ......... 385/127 |
| 5,838,867 A | | 11/1998 | Onishi et al. |
| 5,852,701 A | | 12/1998 | Kato et al. ................... 385/127 |
| 5,999,679 A | * | 12/1999 | Antos et al. ................. 385/127 |
| 6,072,929 A | | 6/2000 | Kato et al. ................... 385/123 |
| 6,178,279 B1 | | 1/2001 | Mukasa et al. |
| 6,301,419 B1 | | 10/2001 | Tsukitani et al. ............ 385/123 |

FOREIGN PATENT DOCUMENTS

| EP | 1043609 | 10/2000 |
| EP | 1072909 | 1/2001 |
| EP | 1083446 | 3/2001 |
| JP | 2000031902 | 1/2000 |
| WO | WO00/67053 | 11/2000 |
| WO | WO00/01177 | 1/2001 |
| WO | WO01/01178 | 1/2001 |
| WO | WO01/01179 | 1/2001 |

OTHER PUBLICATIONS

Lieber et al.; Three–Step–Index Strictly Single–Mode Only F–Doped Silica Fibre For Broadband Low Dispersion; ECOC 1985 (Oct.).

Belov, A.V. et al.; Single–Mode Dispersion Compensator for 1.31/1.55–$\mu$m Long–Haul Communication Lines; OFC/IOOC 1993 Technical Digest (No Month Available).

Onishi et al.; High Performance Dispersion–Compensating Fiber and its Application to Upgrading of 1.31 $\beta$m Optimized System, ECOC 1993 (Sep.).

(List continued on next page.)

Primary Examiner—Rodney Bovernick
Assistant Examiner—Michael J Stahl

(57) ABSTRACT

Disclosed is a singe mode optical waveguide fiber having alternating segments of positive and negative dispersion and dispersion slope. The relative indexes, the refractive index profiles and the radii of the segments are chosen to provide low total dispersion and dispersion slope. Preferred waveguides in accordance with the invention exhibit a dispersion over the range of 1520 to 1625 nm which at all time has a magnitude which is less than 2, and more preferably less that 1 ps/nm-km. The total dispersion of the waveguide fiber is in the range of about −2.0 to +2.0 ps/nm-km at 1550 nm. The waveguide also features a low polarization mode dispersion.

32 Claims, 3 Drawing Sheets

OTHER PUBLICATIONS

Nouchi, P. et al; Low–PMD Dispersion–Compensating Fibers; ECOC 1995 (No Month Available).

Yu et al; A Dispersion Management Scheme For Wide–Area WDM Network; FOC Nov. 1996.

Mukasa et al.; Novel Network Fiber To Manage Dispersion At 1.55µm With Combination of 1.3µ, Zero Dispersion Single Mode Fiber; ECOC Sep. 1997.

Morimoto et al.; Development of Dispersion Compensation Cable Using Reverse Dispersion Fiber; OECC Oct. 1999.

Sasaoka et al.; Design Optimization of SMF–DCF Hybrid Transmission Lines For Long Haul Large Capacity WDM Transmission System; APCC/OECC Oct. 1999.

Yanada et al; Dual–Band Hybrid Transmission Line Consisting of Pure Silica Core Fiber and Dispersion Compensating Fiber; OFCC 2000 (Mar.), vol. 1, pp. 92–94.

Tsuritani et al.; Performance Comparison Between SCDCF–Based System and RDF–Based System in Slope–Compensating Transoceanic WDM Transmission; OFCC Mar. 2000.

Knudsen et al; Large Effective Area Dispersion Compensating Fiber for Cabled Compensation of Standard Single Mode Fiber; OFCC Mar. 2000.

Kato, T.; Temperature Dependence Of Chromatic Dispersion In Various Types of Optical Fibers; OFC Mar. 2000.

Sugizaki, Ryuichi; Dispersion Slope Compensating Fibers for L–band WDM Systems Using NZ–DSF; OFC Mar. 2000.

Gruner–Nielsen et al.; New Dispersion Compensating Fibres for Simultaneous Compensation of Dispersion and Dispersion Slope of Non–zero Dispersion Shifted Fibres in the C or L Band; OFC Mar. 2000.

Suzuki, Y. et al; Dispersion Managed Optical Transmission Lines and Fibers; IEICE Trans on Electronics; Jun. 2000.

Knudsen, S.N. et al.; Optimisation of Dispersion Compensating Fibres For Cabled Long–Haul Applications; Electronics Letters Dec. 7, 2000, vol. 36 No. 25.

K. Mukasa et al., "Novel Network Fiber to Manage Dispersion at 1.55µm with Combination of 1.3µm Zero Dispersion Single Mode Fiber", Furukawa Electric Co., Ltd., Opto–Technology Laboratory (No Date Avail.).

* cited by examiner

US 6,421,490 B1

LOW SLOPE DISPERSION MANAGED WAVEGUIDE

RELATED APPLICATIONS

This application claims the benefit of the filing date of U.S. Provisional Application Nos. 60/075,754, filed Feb. 23, 1998, and No. 60/088,023, filed Jun. 4, 1998.

BACKGROUND OF THE INVENTION

1. Field of the Invention

The present invention is directed to a single mode optical waveguide fiber designed for long repeater spacing, high data rate telecommunication systems. In particular, the single mode waveguide combines excellent bend resistance, low attenuation, low dispersion and low dispersion slope, features that are desired for long distance transmission applications.

2. Technical Background

The requirement in the telecommunication industry for greater information capacity over long distances, without electronic signal regeneration, has led to a reevaluation of single mode fiber index profile design.

Recent developments in erbium-doped fiber amplifiers (EDFAs) and wavelength division multiplexing have enabled high-capacity lightwave systems. In order to achieve high capacity, channel bit rate and signal wavelength ranges can be increased. When bit rate is increased beyond 2.5 Gb/s, fiber dispersion has been a major degradation for long distance. On the other hand, if the dispersion is too low, multi-channel interactions can cause four-wave mixing and degrade system performance. In order to reduce both the dispersion and FWM degradations, dispersion management has been proposed and demonstrated. Dispersion management can be achieved by both cable management where +D and –D fibers are spliced alternatively and fiber management where core canes with +D and –D properties are combined to draw into one fiber.

Thus far, dispersion managed fibers using +D and –D fibers with positive dispersion slope have been proposed wherein the final fiber dispersion has a dispersion and slope similar to dispersion-shifted fiber, in other words, net zero dispersion is in the 1550 nm window and the total dispersion slope is positive. However, there is still a need for alternative designs of dispersion managed waveguides.

Definitions

The following definitions are in accord with common usage in the art. The index of refraction profile is defined in terms of the radii of segments of similar refractive indices. A particular segment has a first and a last refractive index point. The radius from the waveguide centerline to the location of this first refractive index point is the inner radius of the core region or segment. Likewise, the radius from the waveguide centerline to the location of the last refractive index point is the outer radius of the core segment.

The segment radius may be conveniently defined in a number of ways, as will be seen in the description of FIG. 1 below. In FIGS. 1–3, from which Tables 1 & 2 are derived, the radii of the index profile segments are defined as follows, where the reference is to a chart of Δ % vs. waveguide radius:

the outer radius of central major index profile, $r_1$, is measured from the axial centerline of the waveguide to the intersection of the extrapolated central index profile with the x axis, i.e., the Δ %=0 point;

the outer radius, $r_2$, of the first annular segment is measured from the axial centerline of the waveguide to the intersection of the extrapolated or actual central index profile with the x axis, i.e., the Δ %=0 point;

the outer radius, $r_3$, of the second annular segment is measured from the axial centerline of the waveguide to the intersection of the extrapolated central index profile with the x axis, i.e., the Δ %=0 point the outer radius of any additional annular segments is measured analogously to the outer radii of the first and second annular segments; and, the radius of the final annular segment is measured from the waveguide centerline to the midpoint of the segment.

The width, w, of a segment is taken to be the distance between the inner and outer radius of the segment. It is understood that the outer radius of a segment corresponds to the inner radius of the next segment.

The relative index, Δ, is defined by the equation, $$\Delta \% = 100 \times (n_1^2 - n_2^2)/2n_1^2,$$

where $n_1$ is the maximum refractive index of the index profile segment 1, and $n_2$ is a reference refractive index which is taken to be, in this application, the refractive index of the clad layer.

The term refractive index profile or simply index profile is the relation between Δ % or refractive index and radius over a selected portion of the core.

The term α-profile refers to a refractive index profile expressed in terms of Δ (b) %, where b is radius, which follows the equation, $$\Delta (b) \% = \Delta (b_o)(1-[|b-b_o|/(b_1-b_o)]^\alpha),$$

where $b_o$ is the radial point at which the index is a maximum and $b_1$ is the point at which Δ (b) % is zero and b is in the range $b_i \leq b \leq b_f$, where delta is defined above, $b_i$ is the initial point of the α-profile, $b_f$ is the final point of the α-profile, and α is an exponent which is a real number.

Other index profiles include a step index, triangular, trapezoidal, and rounded step index, in which the rounding is typically due to dopant diffusion in regions of rapid refractive index change.

Total dispersion is defined as the algebraic sum of waveguide dispersion and material dispersion. Total dispersion is sometimes called chromatic dispersion in the art. The units of total dispersion are ps/nm-km.

The bend resistance of a waveguide fiber is expressed as induced attenuation under prescribed test conditions. Standard test conditions include 100 turns of waveguide fiber around a 75 mm diameter mandrel and 1 turn of waveguide fiber around a 32 mm diameter mandrel. In each test condition the bend induced attenuation, usually in units of dB/(unit length), is measured. In the present application, the bend test used is 5 turns of the waveguide fiber around a 20 mm diameter mandrel, a more demanding test which is required for the more severe operating environment of the present waveguide fiber.

SUMMARY OF THE INVENTION

One aspect of the present invention relates to a single mode optical waveguide comprising a first fiber component segment having a positive dispersion and a positive dispersion slope, and a second fiber component segment which has a negative dispersion and a negative dispersion slope, wherein the waveguide alternates along its length between segments of the first fiber component and the second fiber component, and wherein the first fiber component segment has a length which is at least two times the length of the second fiber component segment. The waveguide is optimized for the lower attenuation operating wavelength window around 1550 nm, i.e., in the window between about 1520 to 1625 nm.

The waveguide in accordance with the invention may be comprised of a unitary fiber having the various first and second segments therein, e.g., alternating sections of positive and negative dispersion and dispersion slope. Alternatively, the waveguide may be comprised of a cable in which the various fiber component sections are connected along the length of the cable.

Another aspect of the present invention relates to a single mode optical waveguide which manages fiber chromatic dispersion by providing a small total dispersion and a low dispersion slope. Preferred waveguides in accordance with the invention exhibit a dispersion over the range of 1520 to 1625 nm which at all times has a magnitude which is less than 2, and more preferably is less than 1 ps/nm-km. The total dispersion of the waveguide fiber is in the range of about −2.0 to +2, more preferably about −1.0 to +1.0, and most preferably about −0.5 to +0.5 ps/nm-km at 1550 nm. The $r_i$, $\Delta_i$ %, and the refractive index profiles of the various positive and negative dispersion segments are also selected to provide a total attenuation at 1550 nm no greater than 0.25 dB/km.

All of these properties are achieved while maintaining high strength, good fatigue resistance, and good bend resistance, i.e., an induced bend loss no greater than about 0.5 dB, for 1 turn about a 32 mm mandrel, and no greater than 0.05 dB for 100 turns around a 75 mm mandrel. The waveguides in accordance with the invention are also compatible with optical amplifiers. Also, cut off wavelength of fiber in cabled form is less than 1520 nm. An added benefit is a polarization mode dispersion less than about 0.5 ps/$(km)^{1/2}$, more preferably less than 0.3 ps/$(km)^{1/2}$ and typically about 0.1 ps/$(km)^{1/2}$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
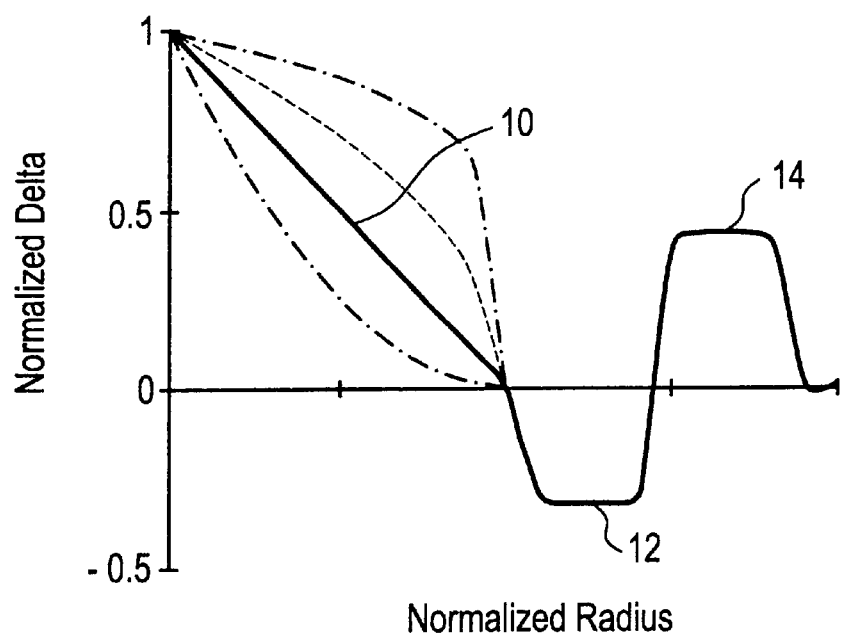
FIG. 1 illustrates a negative dispersion fiber segment profile for use in accordance with the invention.

Reference will now be made in detail to the present preferred embodiments of the invention, examples of which are described with assistance by the accompanying drawings. Wherever possible, the same reference numbers will be used throughout the drawings to refer to the same or like parts.

In the present invention, a low slope and dispersion managed fiber optical waveguide is accomplished by incorporating alternating segments of a first fiber component having a positive dispersion and positive dispersion slope, and a second fiber component having a negative dispersion and a negative dispersion slope, wherein the first fiber component has a length which is at least two times, more preferably at least three times and most preferably at least five times the length of the second fiber component.

The waveguides of the present invention may be in the form of a unitary fiber having alternating sections of positive and negative dispersion and dispersion slope. Such a fiber could be manufactured, for example, by assembling alternating core tablets having desired index profiles within a tube or other support device. The alternating core tablets would create the desired alternating positive and negative dispersion characteristics. The tube containing these alternating component tablets can then be overclad with a silica cladding layer, and the resultant preform consolidated and drawn into a continuous fiber which exhibits alternating sections of positive and negative dispersion and dispersion slope along its length. Such manufacturing techniques are further disclosed, for example, in U.S. patent application Ser. No. 08/844,997, filed Apr. 23, 1997, the specification and drawings of which is incorporated herein by reference in its entirety.

In an alternative embodiment, the waveguide consists of a cabled waveguide. For example, the waveguide may consist of a first fiber component having positive dispersion and positive dispersion slope, having a length of at least 50 km, and more preferably at least 75 km in length, and the second fiber component (negative dispersion and negative dispersion slope) having a length of less than 20 km, but more preferably less than 15 km in length. Such a cabled waveguide may be disposed between amplifiers in an optical fiber communication system. The second fiber component can alternatively be placed in the amplifier side inside the amplifier or amplifier module itself.

The first fiber component, i.e., that having positive dispersion and positive dispersion slope, can be provided by utilizing conventional single mode fiber, such as SMF 28 which is available from Corning Incorporated. SMF-28 has a total dispersion of 17 ps/nm.km, and a dispersion slope of 0.06 ps/nm$^2$.km at 1550 nm.

A variety of fiber profiles can be employed to provide the second fiber component which has a negative dispersion and negative dispersion slope. In a preferred embodiment of the invention, the negative component fiber segment has at least three or four segments to the profile.

FIG. 1 illustrates one embodiment of such a preferred three segment profile for the negative dispersion, negative dispersion slope fiber segment component. The profile in FIG. 1 consists of a first central major index profile 10 of outer radius $r_1$, surrounded by a first annular segment 12 of outer radius $r_2$, surrounded by second annular segment 14 of outer radius $r_3$. A variety of profile shapes can be employed, as illustrated, for example, by the dashed lines associated with possible profile shapes for the first central major index profile 10 in FIG. 1.

The novel single mode optical waveguide is characterized by its segmented core design that provides the unusual combination of properties set forth herein. These properties are achieved by selecting a proper refractive index profile shape of each of the segments and selecting the appropriate relative refractive index delta, $\Delta_i$ %, and radial extent, $r_i$, of the segments. The profile parameters are known to interact. For example, a center region α-profile having an α of about 1, will have a radius different from a center region having a trapezoidal index to provide fibers having essentially identical properties.

The index profiles of the respective segments can be virtually any particular shape, including an α-profile, a step index profile, or a trapezoidal profile. Unless special steps are inserted in the process, the refractive index profiles will be rounded at points where the refractive index changes sharply. The rounding is due to diffusion of the dopant materials used to change the base glass refractive index. Thus any of these index profiles may be rounded at particular points. For example, a step index profile, having a positive Δ % will typically have rounded upper and lower corners.

Set forth below in Table 1 are preferred parameters for radius vs. delta for a 3 segment profile which may be used to form a negative dispersion, negative dispersion slope fiber segment for use in the present invention. As can be seen in the table, the fiber may or may not include a central recessed index area, such as is commonly caused by migration of the germania dopant

TABLE 1

|   | Radius (micron) | Delta (%) |
|---|---|---|
| $r_1$ | 1.25–5 | 0.5–2 |
| $r_2$ | 1.25–10 | −0.5–0.1 |
| $r_3$ | 2.5–15 | 0.1–1.0 |

A core segment tablet of the negative dispersion fiber illustrated in FIG. 1 was combined with conventional single mode fiber (SMF28) having a positive dispersion and positive dispersion slope and drawn into a fiber. The fiber illustrated by solid line in FIG. 1 exhibits a negative dispersion, i.e., about −35 ps/nm.km and a dispersion slope of about −0.15 ps/nm².km at 1550 nm. Thus, in this case, $(D_{SMF}/S_{SMF})=17/0.06=280$, whereas $(D_n/S_n)=-35/-0.15=233$. Consequently, $(D_p/S_p)/(D_n/S_n)=1.2$, which is quite close to 1, as is desirable.

Figure 2:
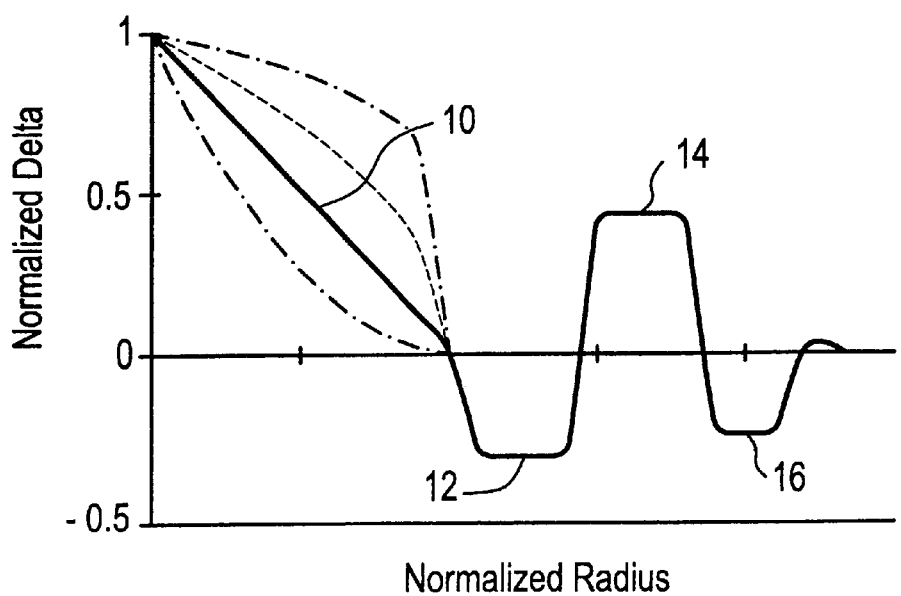
FIG. 2 illustrates an alternative negative dispersion fiber segment index profile in accordance with the invention.

FIG. 2 illustrates such a four segment fiber core profile which is useful as a negative dispersion slope negative dispersion fiber segment in accordance with the invention. The profile illustrated in FIG. 2 incorporates two index depressed regions 12 and 16. In at least one embodiment, the second fiber component comprises a fourth segment having an outer radius $r_4$ in the range of about 5.0 to 25.0 nm and a $\Delta_4$ % in the range of about −0.5 to −0.05%.

TABLE II

|   | Radius (micron) | Delta (%) |
|---|---|---|
| $r_1$ | 1.25–5 | 0.5–2 |
| $r_2$ | 1.25–10 | −0.5—0.1 |
| $r_3$ | 2.5–15 | 0.1–1.0 |
| $r_4$ | 5–25 | −0.5–0 |

Any of the profiles disclosed herein may also include a centerline dip section, which is an area of depressed relative refractive index which is less than the peak delta of the first major core segment. Such centerline dips are commonly caused by so called burn-out, or migration of dopant ions, which sometimes occurs during manufacture of optical fiber waveguides.

The waveguides in accordance with the invention preferably exhibit a dispersion over the range of 1520 to 1625 nm which at all times has a magnitude which is less than 2, and more preferably less than 1 ps/nm-km. The total dispersion of the waveguide fiber is in the range of about −2.0 to +2.0, more preferably about −1.0 to +1.0, and most preferably about −0.5 to +0.5 ps/nm-km at 1550 m. The $r_i$, $\Delta_i$ %, and the refractive index profiles of the various positive and negative dispersion segments are also selected to provide a total attenuation at 1550 nm no greater than 0.25 dB/km. In at least one embodiment, the first and second fiber components are selected so that the waveguide exhibits a total dispersion in the range of about −2.0 to 0.0 ps/nm-km at 1550 nm.

All of these properties are achieved while maintaining high strength, good fatigue resistance, and good bend resistance, i.e., an induced bend loss no greater than about 0.5 dB, for 1 turn about a 32 mm mandrel, and no greater than 0.05 dB for 100 turns around a 75 mm mandrel. The waveguides in accordance with the invention are also compatible with optical amplifiers. Also, cut off wavelength of fiber in cabled form is less than 1520 nm. An added benefit is a polarization mode dispersion less than about 0.5 ps/$(km)^{1/2}$, more preferably less than 0.3 ps/$(km)^{1/2}$.

One particularly preferred dispersion managed waveguide of the present invention manages fiber chromatic dispersion by providing a negative total dispersion as well as a low dispersion slope. In systems in which the suppression of potential soliton formation is important, it is desirable that the total dispersion of the waveguide fiber be negative, so that the linear dispersion cannot counteract the non-linear self phase modulation which occurs for high power signals.

To equalize fiber chromatic dispersion the following relation should preferably be satisfied as closely as possible:

$$D_p L_p + D_n L_n = 0,$$

where D and L stand for dispersion and fiber length, the subscripts "p" and "n" stand for positive and negative dispersion fiber components. Furthermore, in order to equalize the dispersion slope, the following relation should preferably be satisfied as closely as possible:

$$(D_p/S_p)/(D_n/S_n)=1,$$

where S is the dispersion slope.

The waveguides described herein are suitable for use in high power and long distance transmission applications, including conventional RZ (return to zero) or NRZ (non-return to zero), as well as soliton transmission applications. The definition of high power and long distance is meaningful only in the context of a particular telecommunication system wherein a bit rate, a bit error rate, a multiplexing scheme, and perhaps optical amplifiers are specified. There are additional factors, known to those skilled in the art, which have impact upon the meaning of high power and long distance. However, for most purposes, high power is an optical power greater than about 10 mW per channel. In some applications, signal power levels of 1 mW or less are still sensitive to non-linear effects, so that $A_{eff}$ is still an important consideration in such lower power systems.

A long distance is one in which the distance between electronic regenerators can be in excess of 100 to 120 km. The regenerators are to be distinguished from repeaters which make use of optical amplifiers. Repeater spacing, especially in high data density systems, can be less than half the regenerator spacing.

The invention will be further clarified by the following example which is intended to be exemplary of the invention.

EXAMPLE

Figure 3:
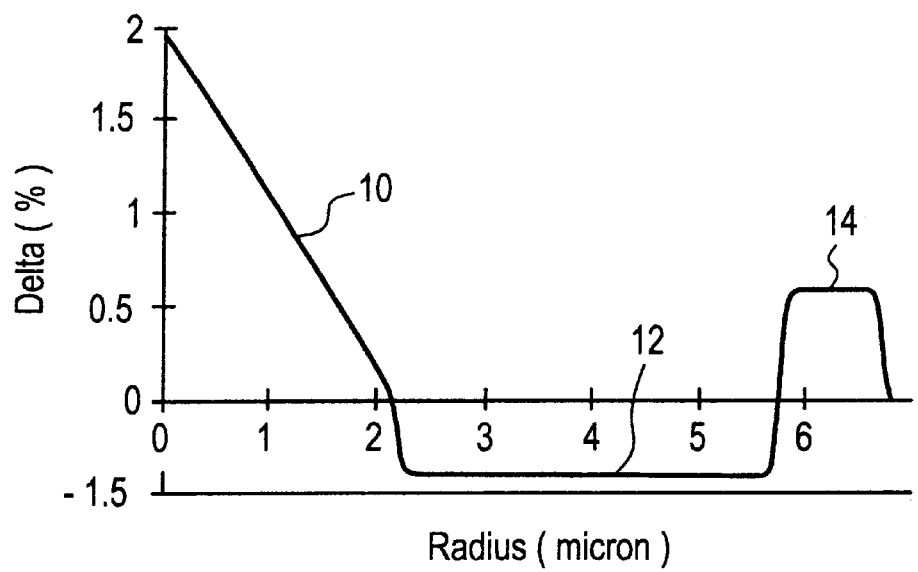
FIG. 3 illustrates an alternative and preferred negative dispersion fiber segment profile.

A particularly preferred three segment refractive index profile for use as the negative dispersion, negative slope fiber segment is illustrated in FIG. 3. This particular profile exhibits a dispersion of −35.47 ps/nm.km and slope of −0.1018 ps/nm².km at 1550 nm. The cutoff wavelength is 1.18 micron and pin-array bend loss of 1.3 dB, MFD of 4.8 micron and Deff of 4.68 micron at 1550 nm.

Figure 4:
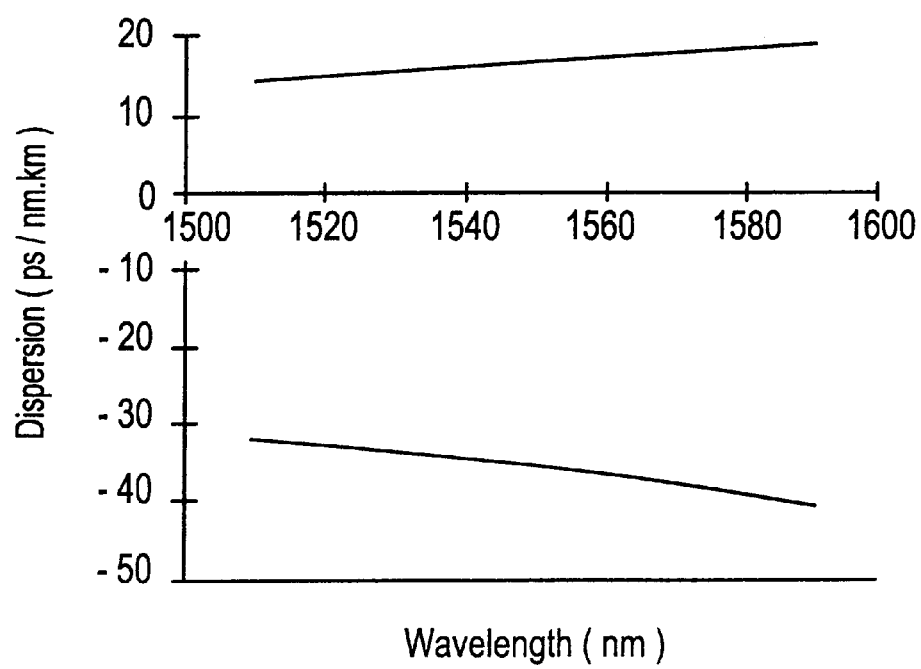
FIG. 4 illustrates the dispersion characteristics of a alternating +D and −D segment fiber in accordance with the invention.

FIG. 4 illustrates the dispersion characteristics achieved when a positive dispersion fiber component, in this case SMF-28, is combined with the negative dispersion fiber component of the FIG. 3 variety having the following parameters:

|  | Delta (%) | Radius ($\mu$m) |
| --- | --- | --- |
| Core | 2 | 2.2 ($r_1$) |
| First moat | −0.4 | 5.76 ($r_2$) |
| Ring | 0.6 | 6.72 ($r_3$) |

Table III below lists the resultant dispersion and dispersion slope properties, as well as the ratio of dispersion to dispersion slope which is achieved by this combination of alternating fiber segments.

TABLE III

|  | +D Fiber | −D Fiber |
| --- | --- | --- |
| D (ps/nm · km) | 17 | −35 |
| S (ps/nm² · km) | 0.058 | −0.1018 |
| D/S (nm) | 293 | 350 |

Figure 5:
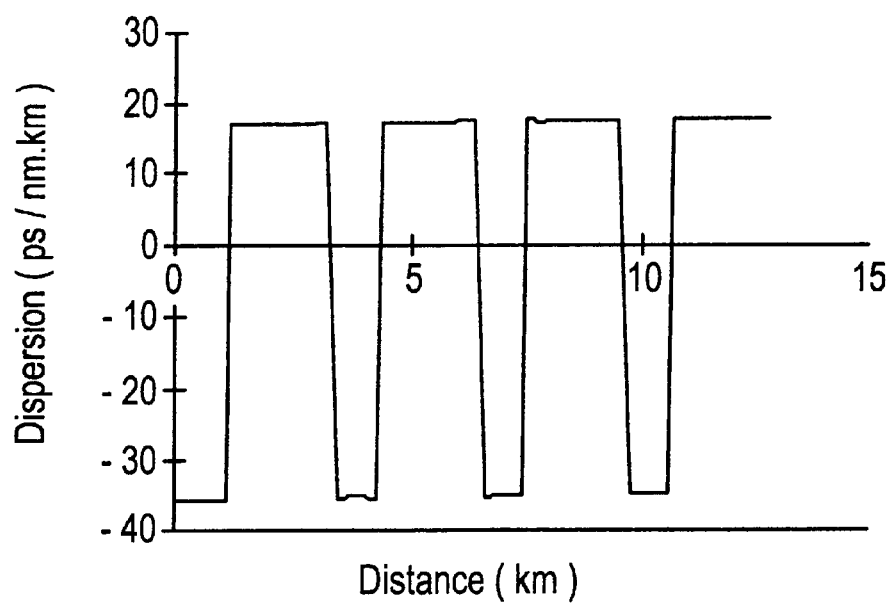
FIG. 5 illustrates the dispersion vs. distance of a dispersion flattened and dispersion managed fiber in accordance with the invention.

FIG. 5 illustrates the axial design of the resultant waveguide fiber, in terms of dispersion (ps/nm-km) over waveguide length (km) for the resultant dispersion flattened, dispersion managed fiber.

Figure 6:
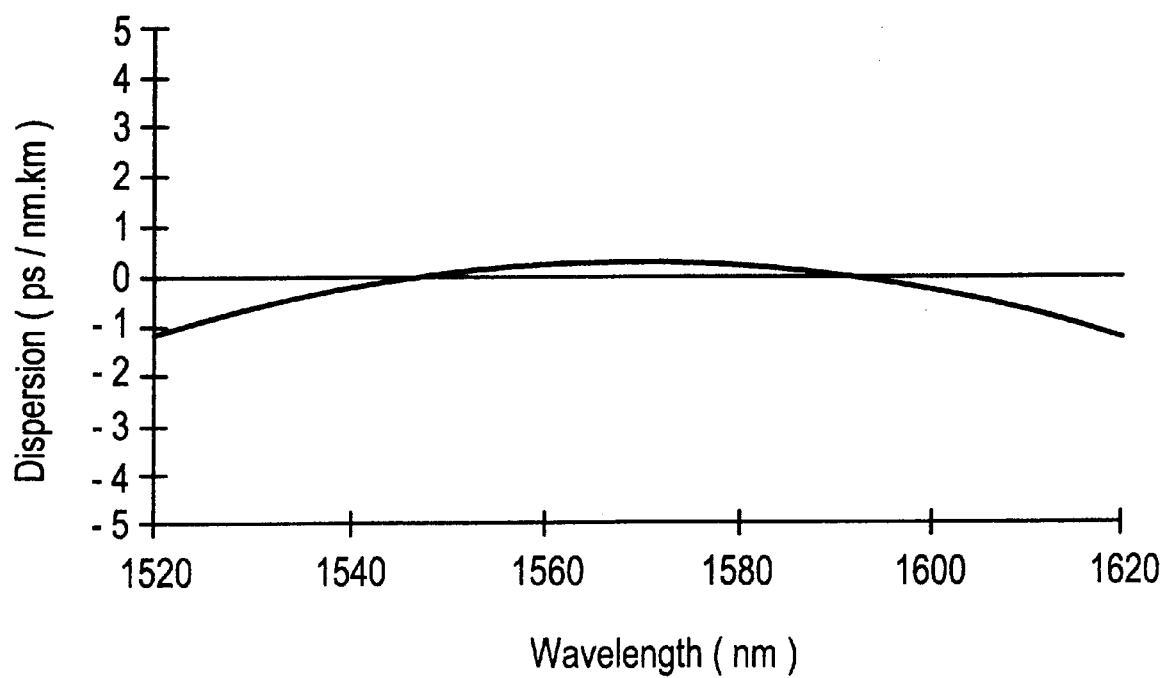
FIG. 6 illustrates the dispersion vs. wavelength curve for a dispersion flattened and managed fiber in accordance with the present invention.

FIG. 6 illustrates the resultant total dispersion characteristics of the dispersion flattened and managed fiber. $L_p/L_n$, is about 2:1 in this example. The period $L_n+L_p$ is approximately 3 km. As can be seen in FIG. 6., for this design example, total dispersion is much less than 1 ps/nm.km, and in fact is less than about 0.5 ps/nm.km, from 1520 to 1620 nm. This is consistent with the low loss window of single mode fibers. According to the loss spectrum of a conventional single mode fiber, the attenuation is less than 0.22 dB/km from 1520 to 1620 nm.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A single mode optical waveguide comprising:
    a first fiber component having positive dispersion and a positive dispersion slope in an operating wavelength window between about 1520 nm to 1625 nm;
    a second fiber component comprising at least three segments including:
        a first segment having a positive $\Delta_1$ %;
        a second segment having a negative $\Delta_2$ %; and
        a third segment having a positive $\Delta_3$ %;
    wherein $\Delta_1$ % > $\Delta_3$ % > $\Delta_2$ %;
    wherein the second fiber component has negative dispersion and a negative dispersion slope in an operating wavelength window between about 1520 nm to 1625 nm;
    wherein the waveguide exhibits an attenuation of no greater than 0.25 dB/km; and
    wherein the waveguide exhibits an induced bend loss no greater than about 0.05 dB for 100 turns about a 75 mm mandrel.

2. The waveguide of claim 1, wherein said first fiber component has a length which is at least two times the length of said second fiber component.

3. The waveguide of claim 1, wherein said first fiber component has a length which is at least five times the length of said second fiber component.

4. The waveguide of claim 1, wherein the first and second fiber components are selected so that said waveguide exhibits a dispersion over the range of 1520 to 1625 nm which at all times has a magnitude which is less than 2 ps/nm-km.

5. The waveguide of claim 1, wherein the first and second fiber components are selected so that said waveguide exhibits a dispersion over the range of 1520 to 1625 nm which at all times has a magnitude which is less than 1 ps/nm-km.

6. The waveguide of claim 1, wherein the first and second fiber components are selected so that, said waveguide exhibits a total dispersion in the range of about −2.0 to +2.0 ps/nm-km at 1550 nm.

7. The waveguide of claim 1, wherein the first and second fiber components are selected so that said waveguide exhibits a total dispersion in the range of about −2.0 to 0.0 ps/nm-km at 1550 nm.

8. The waveguide of claim 7, wherein said waveguide exhibits an induced bend loss no greater than about 0.5 dB, for 1 turn about a 32 mm mandrel, a cut off wavelength of fiber in cabled form is less than 1520 nm, and a polarization mode dispersion less than about 0.5 ps/(km)$^{1/2}$.

9. The waveguide of claim 1, wherein said waveguide comprises a cabled waveguide, and said waveguide is disposed between amplifiers, and said first component is at least 50 km in length, and said second fiber component is less than 20 km in length.

10. The waveguide of claim 1, wherein said waveguide comprises a cabled waveguide, and said waveguide is disposed between amplifiers, and said first component is at least 75 km in length, and said second fiber component is less than 15 km in length.

11. The waveguide of claim 1, wherein said first fiber component comprises single mode fiber having a step index profile.

12. The single mode optical fiber of claim 11, wherein said second fiber component comprises a core having at least three segments, wherein the first segment has an outer radius $r_1$ in the range of about 1.25 to 5.0 μm and a $\Delta_1$ % in the range of about 0.5 to 2.0%, the second segment has an outer radius $r_2$ in the range of about 1.25 to 10.0 μm and a $\Delta_2$ % in the range of about −0.05 to −0.1%, the third segment has an outer radius $r_3$ in the range of about 2.5 to 15.0 μm and a $\Delta_3$ % in the range of about 0.1 to about 1.0%.

13. The single mode optical waveguide of claim 12, wherein said second fiber component further comprises a fourth segment having an outer radius $r_4$ in the range of about 5.0 to 25.0 μm and a $\Delta_4$ % in the range of about −0.5 to −0.05%.

14. The single mode optical waveguide of claim 1, wherein said first fiber component has a length which is at least two times the length of said second fiber component, and the profiles of the first and second fiber components are selected so that said waveguide exhibits a dispersion over the range of 1520 to 1625 nm which at all times has a magnitude which is less than 2 ps/nm-km.

15. The waveguide of claim 14, wherein said first fiber component has a length which is at least five times the length of said second fiber component.

16. The waveguide of claim 15, wherein the first and second fiber components are selected so that said waveguide exhibits a dispersion over the range of 1520 to 1625 nm which at all times has a magnitude which is less than 1 ps/nm-km.

17. The waveguide of claim 14, wherein the first and second fiber components are selected so that said waveguide exhibits a total dispersion in the range of about −2.0 to +2.0 ps/nm-km at 1550 nm.

18. The waveguide of claim 17, wherein said first fiber component comprises single mode fiber having a step index profile, and said second fiber component comprises a core having at least three segments, wherein the first segment has an outer radius $r_1$ in the range of about 1.25 to 5.0 μm a $\Delta_1$ % in the range of about 0.5 to 2.0%, the second segment has an outer radius $r_2$ in the range of about 1.25 to 10.0 μm and a $\Delta_2$ % in the range of about −0.5 to about −0.1%, and the third second segment has an outer radius r3 in the range of about 2.5 to 15.0 μm and a $\Delta_3$ % in the range of about 0.1 to about 1.0%.

19. The single mode optical fiber of claim 1, wherein the second fiber component is retained within an optical amplifier.

20. The waveguide of claim 1 wherein, the waveguide exhibits a polarization mode dispersion less than about 0.5 ps/km$^{1/2}$.

21. The waveguide of claim 1 wherein, the waveguide exhibits a polarization mode dispersion less than about 0.3 ps/km$^{1/2}$.

22. The waveguide of claim 1 wherein, the waveguide exhibits a polarization mode dispersion less than about 0.1 ps/km$^{1/2}$.

23. The waveguide of claim 22, wherein the second segment has an outer radius $r_2$ in the range of about 1.25 to 10.0 μm and a $\Delta_2$ % in the range of about −0.5 to about −0.1.

24. The waveguide of claim 23, wherein the third segment has an outer radius $r_3$ in the range of about 2.5 to 15.0 μm and a $\Delta_3$ % in the range of about 0.1 to about 1.0.

25. The waveguide of claim 1, wherein the first segment has an outer radius $r_1$ in about 1.25 to 5.0 μm and a $\Delta_1$ % in the range of about 0.5 to 2.0.

26. The waveguide of claim 1, wherein the dispersion to slope ratio of the first fiber component divided by the dispersion to slope ratio of the second fiber component is equal to about 1.

27. The waveguide of claim 1, wherein lengths of the first and second fiber components are selected such that the dispersions of the first and second fiber components are substantially equalized.

28. The waveguide of claim 1 wherein, the dispersion slopes of the first and second fiber components are substantially equalized.

29. The waveguide of claim 28, wherein the waveguide exhibits a polarization mode dispersion less than about 0.5 ps/km$^{1/2}$.

30. The waveguide of claim 1 wherein, the dispersions of the first and second fiber components are substantially equalized and the dispersion slopes of the first and second fiber components are substantially equalized.

31. A single mode optical waveguide comprising:
a first fiber component having positive dispersion and a positive dispersion slope in an operating wavelength window between about 1520 nm to 1625 nm; and
a second fiber component comprising at least three segments including:
a first segment having an outer radius $r_1$ in the range of about 1.25 to 5.0 μm and a $\Delta_1$ % in the range of about 0.5 to 2.0;
a second segment having an outer radius $r_2$ in the range of about 1.25 to 10.0 μm and a $\Delta_2$ % in the range of about −0.5 to about −0.1; and
a third segment having an outer radius $r_3$ in the range of about 2.5 to 15.0 μm and a $\Delta_3$ % in the range of about 0.1 to about 1.0;
wherein $r_{3>r2}>r_1$ and $\Delta_1 \% > \Delta_3 \% > \Delta_2 \%$;
wherein the second fiber component has negative dispersion and a negative dispersion slope in an operating wavelength window between about 1520 nm to 1625 nm;
wherein the waveguide exhibits an attenuation of no greater than 0.25 dB/km; and
wherein the waveguide exhibits an induced bend loss no greater than about 0.05 dB for 100 turns about a 75 mm mandrel.

32. A single mode optical waveguide comprising:
a first fiber component having positive dispersion and a positive dispersion slope in an operating wavelength window between about 1520 nm to 1625 nm; and
a second fiber component comprising at least three segments including:
a first segment having an outer radius $r_1$ in the range of about 1.25 to 5.0 μm and a $\Delta_1$ % in the range of about 0.5 to 2.0;
a second segment having an outer radius $r_2$ in the range of about 1.25 to 10.0 μm and a $\Delta_2$ % in the range of about −0.5 to about −0.1; and
a third segment having an outer radius $r_3$ in the range of about 2.5 to 15.0 μm and a $\Delta_3$ % in the range of about 0.1 to about 1.0;
wherein $r_3 > r_2 > r_1$, and $\Delta_1 > \Delta_3 > \Delta_2$;
wherein the second fiber component has negative dispersion and a negative dispersion slope in an operating wavelength window between about 1520 nm to 1625 nm;
wherein the waveguide exhibits an attenuation of no greater than 0.25 dB/km;
wherein the waveguide exhibits an induced bend loss no greater than about 0.05 dB for 100 turns about a 75 mm mandrel; and
wherein the waveguide exhibits a polarization mode dispersion less than about 0.5 ps/km$^{1/2}$.

* * * * *

UNITED STATES PATENT AND TRADEMARK OFFICE
CERTIFICATE OF CORRECTION

PATENT NO. : 6,421,490 B1
DATED : July 16, 2002
INVENTOR(S) : Liu Yanming

It is certified that error appears in the above-identified patent and that said Letters Patent is hereby corrected as shown below:

<u>Title page,</u>
Item [56], References Cited, OTHER PUBLICATIONS, third reference, "Onishi et al" "Fiber and its Application to Upgrading of 1.31 βm Opti-"
Third reference, "Mukasa et al" "At 1.55 μm With Combination of 1.3μ, Zero Dispersion" should be -- At 1.55 μm With Combination of 1.3μm, Zero Dispersion --
Item [57], ABSTRACT,
Line 8, "time has a magnitude which is less than 2, and more" should be
-- times has a magnitude which is less than 2, and more --

<u>Column 8,</u>
Line 43, "fiber components are selected so that, said waveguide exhib-" should be
-- fiber components are selected so that said waveguide exhib- --
Line 62, "posed between amplifiers, and said first component is at least" should be
-- posed between amplifiers, and a said first component is at least --

<u>Column 9,</u>
Line 1, "12. The single mode optical fiber of claim 11, wherein" should be
-- 12. The single mode optical waveguide of claim 11, wherein --
Line 7, "in the range of about –0.05 to –0.1%, the third segment has" should be
-- in the range of about –0.05 to about –0.1%, and the third segment has --
Line 63, "has an outer radius $r_1$ in about 1.25 to 5.0 μm and a $\Delta_1\%$ in" should be
-- has an outer radius $r_1$ in the range of about 1.25 to 5.0 μm and a $\Delta_1\%$ in --

<u>Column 10,</u>
Line 28, "wherein $r_{3>r2}>r_1$ and $\Delta_1\% > \Delta_3\% > \Delta_2\%$;" should be -- wherein $r_3>r_2>r_1$ and $\Delta_1\% > \Delta_3\% > \Delta_2\%$ --

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,421,490 B1
DATED : July 16, 2002
INVENTOR(S) : Liu Yanming

It is certified that error appears in the above-identified patent and that said Letters Patent is hereby corrected as shown below:

Title page,
Item [56], References Cited, OTHER PUBLICATIONS, third reference, "Onishi et al" "Fiber and its Application to Upgrading of 1.31 βm Opti-" should be -- "Fiber and its Application to Upgrading of 1.31 μm Opti-" --
Page 2, third reference, "Mukasa et al" "At 1.55 μm With Combination of 1.3μ, Zero Dispersion" should be -- At 1.55 μm With Combination of 1.3μm, Zero Dispersion --
Item [57], ABSTRACT,
Line 8, "time has a magnitude which is less than 2, and more" should be
-- times has a magnitude which is less than 2, and more --

Column 8,
Line 43, "fiber components are selected so that, said waveguide exhib-" should be
-- fiber components are selected so that said waveguide exhib- --
Line 62, "posed between amplifiers, and said first component is at least" should be
-- posed between amplifiers, and a said first component is at least --

Column 9,
Line 1, "12. The single mode optical fiber of claim 11, wherein" should be
-- 12. The single mode optical waveguide of claim 11, wherein --
Line 7, "in the range of about –0.05 to –0.1%, the third segment has" should be
-- in the range of about –0.05 to about –0.1%, and the third segment has --
Line 63, "has an outer radius $r_1$ in about 1.25 to 5.0 μm and a $\Delta_1\%$ in" should be
-- has an outer radius $r_1$ in the range of about 1.25 to 5.0 μm and a $\Delta_1\%$ in --

UNITED STATES PATENT AND TRADEMARK OFFICE
CERTIFICATE OF CORRECTION

PATENT NO. : 6,421,490 B1
DATED : July 16, 2002
INVENTOR(S) : Liu Yanming

It is certified that error appears in the above-identified patent and that said Letters Patent is hereby corrected as shown below:

<u>Column 10,</u>
Line 28, "wherein $r_{3>r2}>r_1$ and $\Delta_1\% > \Delta_3\% > \Delta_2\%$;" should be -- wherein $r_3>r_2>r_1$ and $\Delta_1\% > \Delta_3\% > \Delta_2\%$ --

This certificate supersedes Certificate of Correction issued January 27, 2004.

Signed and Sealed this

Twentieth Day of July, 2004

JON W. DUDAS
*Acting Director of the United States Patent and Trademark Office*